United States Patent [19]
Knoll et al.

[11] Patent Number: 5,732,368
[45] Date of Patent: Mar. 24, 1998

[54] METHOD FOR DISPLAYING INFORMATION ON A SCREEN

[75] Inventors: Peter Knoll, Ettlingen; Winfried Koenig, Pfinztal; Christa Heiland-Franzen, Eggenstein-Leopoldshafen, all of Germany

[73] Assignee: Robert Bosch GmbH, Stuttgart, Germany

[21] Appl. No.: 533,420

[22] Filed: Sep. 25, 1995

[30] Foreign Application Priority Data

Sep. 23, 1994 [DE] Germany ............... 44 33 953.4

[51] Int. Cl.⁶ .......................................... G06F 7/70
[52] U.S. Cl. .................. 701/1; 345/8; 345/149; 348/478; 395/131; 395/126
[58] Field of Search ................... 395/500, 131, 395/140, 126, 501, 508, 516, 604, 117, 784, 970, 965; 364/449.5, 449.3, 578, 423.098; 345/186, 199, 149, 8, 200; 455/158.4, 186.1, 186.2, 345–347, 90, 128; 340/988, 990, 995; 359/630, 13–15, 619, 629; 348/478, 553, 565

[56] References Cited

U.S. PATENT DOCUMENTS

| | | | |
|---|---|---|---|
| 5,416,478 | 5/1995 | Morinaga | 340/995 |
| 5,422,812 | 6/1995 | Knoll et al. | 364/449.3 |
| 5,459,824 | 10/1995 | Kashiwazaki | 364/449.5 |
| 5,479,606 | 12/1995 | Gray | 395/166 |
| 5,561,471 | 10/1996 | Kim et al. | 348/565 |

FOREIGN PATENT DOCUMENTS

| | | |
|---|---|---|
| 0 267 085 A1 | 5/1988 | European Pat. Off. . |
| 31 49 291 A1 | 6/1983 | Germany . |
| 35 14 438 C1 | 9/1986 | Germany . |
| 43 07 367 A1 | 9/1994 | Germany . |

*Primary Examiner*—Jacques Louis-Jacques
*Attorney, Agent, or Firm*—Kenyon & Kenyon

[57] ABSTRACT

A method for displaying information on a screen of a display device in a motor vehicle is described. Information to be displayed and/or its forms of representation are selected from a range of options displayed on the screen by the actuation of command keys. An evaluation is made thereby of the speed of operation of the command keys and/or the frequency distribution of the user's selection of the information and of the forms of representation. The evaluation is then used to change the range of options represented and/or the information displayed and/or the forms of representation of the information displayed.

12 Claims, 4 Drawing Sheets

METHOD FOR DISPLAYING INFORMATION ON A SCREEN

FIELD OF THE INVENTION

The present invention relates to a method for displaying information on a screen, particularly to a method for displaying information on a screen of a display device in a motor vehicle.

BACKGROUND INFORMATION

It is known to provide display systems in motor vehicles which display information required for driving a motor vehicle as well as other information. Such display systems are usually arranged on the dashboard in the central field of view of the vehicle driver. For example, German Published Patent Application No. 31 49 291 A1 proposes to combine the required and additional, individual informational displays in so-called combination display devices and then to build these as a unit into the dashboard of the motor vehicle. The combination display devices are supplied with the necessary data from known sensors arranged at appropriate points on the motor vehicle, or if necessary, via conversion or computer systems. The individual information may include, for example, the velocity, engine speed, oil temperature, coolant temperature, etc., as the necessary information, and the outside and/or inside temperature, seat position, the switching state of various accessories, etc., as the additional information.

Such combination display devices, however, have the disadvantage that the way in which the individual displays are represented is permanently predetermined, that is to say, whether the display is designed as an analog or digital display, as a needle or bar, large or small, colored or not colored, the color, the color intensity, etc. are fixed parameters.

German Patent No. 35 14 438 C1 (the "'438 reference") describes a central command input and information output means for controlling a plurality of accessories built into a vehicle. The device described in the '438 reference has a display unit whose display can be subdivided into fields for representing information and function selection tables. The device further includes command keys assigned to the elements of the menus represented, in which the elements of the menus indicate functions that can be activated by the respective command keys. Individual menus which control one or more accessories can be selected via at least one basic menu that can be represented on the display. Additional control elements are provided for directly accessing, at all times, specific basic functions of the central command input and information output means, regardless of the menu currently selected. At least one personal menu, which can be created individually by a user from the elements of all the menus, can be represented on the display. The device functions that are of particular interest to the user can be selected via the personal menu.

Although the information desired can be selected by the user and represented on the information output means, it is not possible, with the device of the '438 reference, to represent several items of information simultaneously and then also to reproduce them in different forms as desired by the user. With the central command input and information output means of the '438 reference, it is always necessary for the individual displays required for driving a motor vehicle to be additionally available.

SUMMARY OF THE INVENTION

The present invention provides a method for displaying information on a screen which, in contrast to known methods and apparatus, has the advantage that all the information required for driving the motor vehicle, and moreover additionally desired information, can be represented in a central field of view of the vehicle driver in a configuration and form desired by the user. In the method of the present invention, a measure of the level of experience of the user in using the display device is obtained on the basis of an evaluation of the actuations of associated command keys for the purpose of controlling the representation of the information. The evaluation also determines the frequency distribution of the actuation of the command keys, whereupon the representation of the information and of the range of options is adapted to the user.

The representation of the range of options in the form of symbols, letters or numbers constitutes an advantage of the present invention which makes it easier for the user to make a selection without the interruption of a thought process and thus without distracting the user from what is happening in traffic.

The presentation of additional information as an operating aid when a low user operating speed is detected is an advantageous feature of the present invention. When a low user operating speed is detected, it can be assumed that the user has little experience with the selection and display procedure and requires the additional information to increase the operating speed, which is desirable for improving safety in traffic.

It is likewise advantageous to provide no representation of the range of options or only a simplified representation when a high user operating speed is determined. In this case, it can be assumed that the user already has a higher level of experience and that additional representations are superfluous.

A further advantage is conferred with the method of the present invention by presenting the range of options so that frequently selected information or forms of representation can be selected with fewer actuations of command keys than information or forms of representation that are selected less often. This minimizes the effort for representing the information or forms of representation selected most frequently, and it takes account of the fact that it is very probable that the user performing the selection will in the future select the representation characterized by a high frequency of selection.

By representing the range of options in the form of a menu with several levels, the method of the present invention provides the advantage that a clearer display of the range of options is realized. The offering of the most frequently selected information on the main level of the menu allows for a simplified and faster selection of the most frequently selected information.

A further advantageous feature of the present invention is the display of important information repeatedly at periodic intervals or immediately upon the occurrence of a particular event. By displaying such important information, the safety of the user present in the vehicle is ensured irrespective of the information selected by the user. By switching back from the display of important information to the display of other information, the user is not unnecessarily forced to repeat the inputs made before the important information was displayed.

Changes made by the evaluation procedure are stored in a memory means, whereby in the event of a power failure or if the vehicle is switched off, the settings for the display previously selected by the user are displayed again as desired, without repeating the entire input procedure.

By storing the changes in the memory means together with a personal identifier, a direct assignment to the user is possible, with the consequent advantage that if the users change, in each case the information and changes from the memory means associated with the user currently using the display are used. This facilitates the selection procedure despite the use by several different users.

DETAILED DESCRIPTION OF THE DRAWINGS

Figure 1:
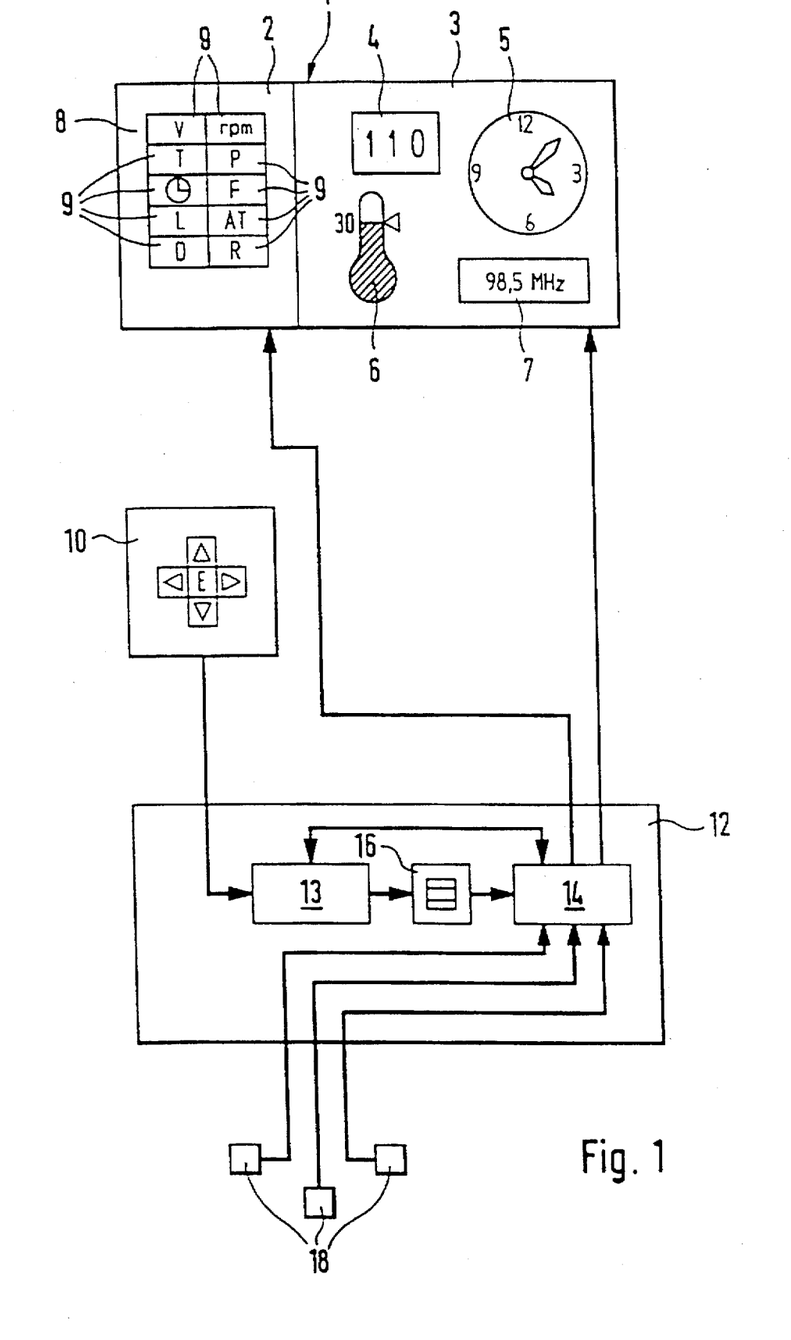
FIG. 1 shows an embodiment of a display device, in accordance with the present invention.

FIG. 1 shows an embodiment of a display device, in accordance with the present invention, comprising a screen 1 which includes a selection area 2 and a display area 3. The device of FIG. 1 also comprises a keypad 10 which is connected to a data processing device 12. The data processing device 12 comprises an evaluation unit 13, a memory means 16 and a display processor 14. The keypad 10 is connected to an input of the evaluation unit 13. The evaluation unit 13 is coupled, via the memory means 16, to an input of the display processor 14. The evaluation unit 13 is also connected directly to the display processor 14. A plurality of sensors 18 are connected to further inputs of the display processor 14. Leading out from the display processor 14 are two outputs, one of which leads to the selection area 2 and the other of which leads to the display area 3.

Represented in the selection area 2 is a range of options 8 which comprises control fields 9. Represented in the display area 3 is information 4 for displaying the speed, information 5 for displaying the time, information 6 for displaying the temperature and information 7 for displaying the frequency setting for the vehicle's radio receiver.

A user of the device, usually the person driving the motor vehicle, views the screen 1 in order to read the motor vehicle-specific information displayed. The display area 3 serves solely to display the vehicle-specific information, while the selection area 2 of the screen 1 serves to display the range of options 8. From the range of options 8, the user, by operating the keypad 10, can select from a variety of information items represented by the control fields 9, in order to thus obtain the desired representation of selected information in the display area 3. Information about the radio, speed, temperature, time, air pressure, direction of travel, rotational speed of the engine (rpm), oil pressure, fuel level and outside temperature is displayed in the selection area 2, by way of example.

Upon actuation, the keypad 10 outputs corresponding signals to the evaluation unit 13 for evaluation. The signals are evaluated in the evaluation unit 13 on the basis of the range of options 8 currently being represented by the display processor 14, so that the input is clearly assigned to one item of information during the evaluation. Information supplied by the sensors 18 reaches the display processor 14 which controls the displaying of the information of the sensors 18 in the display area 3 of the screen 1. The result of the evaluation in the evaluation unit 13 proceeds via the memory means 16 to the display processor 14, where said event causes a selection of information, from the signals supplied by the sensors 18, matching the result of the evaluation. The information selected is displayed in the display area 3. The form of representation for the information to be displayed, i.e., the size, color, representation parameters or representation in analog or digital format, is generated here by means of the display processor 14.

After various forms of representation have been offered in the range of options 8, the user enters the desired form of representation on the keypad 10. The input is evaluated with reference to the currently represented range of options 8, of which the display processor 14 notifies the evaluation unit 13. The corresponding selection of a form of representation of an item of information to be displayed in the display processor 14 is again accomplished on the basis of the result of an evaluation of the signals in the evaluation unit 13, which proceed to the evaluation unit 13 after having been input by means of the keypad 10. In addition, the display processor 14 controls the representation of the range of options 8 in the selection area 2. The range of options 8 is represented, for example, in the form of a menu having a plurality of levels, which are represented depending on the input from the keypad 10. For this, corresponding signals proceed from the evaluation unit 13 to the display processor 14, which notify the display processor 14 which input has just been detected.

In the evaluation unit 13, the time interval between actuations of the command keys is measured so that a measure of the operating speed is obtained. In addition, the evaluation unit 13 registers which of the information or forms of representation offered is selected by the user by preference. The data obtained which relate to user operating speed and preferred information or forms of representation proceed to the memory means 16 for buffering. From the memory means 16, the data proceeds, in turn, to the display processor 14.

In the display processor 14, the display of information and its forms of representation are now adapted as the user wishes. It is assumed that in the case of a high user operating speed, the user has a correspondingly high degree of experience in using the display device. Conversely, in the case of a low operating speed, it is assumed that the user still has difficulties using the display device and therefore still requires additional selection aids in order to facilitate the process of learning to use the display device and the display procedure. Accordingly, additional information from the display processor 14 is sent to the selection area 2, in addition to the range of options previously offered in the control fields 9, and is displayed there to provide a selection aid for the user. For example, the more readily understandable terms "speed" or "temperature" could be displayed along with the abbreviations "V" and "T" as additional information for such a user.

Conversely, in the case of a high user operating speed, redundant parts of the range of options can be removed from the selection area 2 by means of the display processor 14, since in this case it can be assumed that the user has sufficient experience to be able to make clear selections even with a reduced representation of the range of options and that the user does not wish to be burdened with redundant additional information.

It is furthermore provided that the range of options 8 is adapted in such a way that the information or forms of representation selected most frequently are represented in the range of options 8 in such a way that their selection by the user can be achieved with fewer actuations of the keypad 10 than information or forms of representation selected comparatively less often. A menu having a plurality of levels is constructed in such a way that as the selection frequency increases, so too does the height of the level relative to the main level. This serves to allow the user to select the desired information or change the form of representation of the information with as few key actuations as possible if the information is currently not being displayed in the display area 3 or is being displayed in another form of representation.

The display method of the present invention can also be used to permanently represent the information selected most frequently, whereas information selected less often is represented periodically in alternation or interrupted by other information. Thus, for example, the speedometer can be displayed at all times, irrespective of the user's wishes. Alternatively, the time or the fuel tank level can be displayed at period for example, for example every 15 minutes.

It is however also provided that especially important information overrides the wish of the user and is represented on the screen 1 upon the occurrence of an event associated with the information, irrespective of the selection made by the user. Thus, for example, the fuel tank display may light up if the level falls below a threshold value in order to give the driver the opportunity to refuel in good time on the basis of this information. Similar triggering events may be the crossing of threshold values for temperature or pressure, or the exceeding of a permitted speed. An appropriate priority for such important information can likewise be permanently preset, or else can be variable as the user desires after presentation of a selection of priorities. Accordingly, it is furthermore provided that the display is also switched back to the original form of representation, in particular once the triggering event has ceased.

The method of the present invention further allows a user to enter, via the keypad 10, a personal identifier which links the data obtained with the user. In the case of alternating users, by entering the personal identifier, it is possible to obtain an automatic adaption of the display on the screen 1 in accordance with the data last generated by the identified user and stored in the memory means 16, without a renewed complicated input procedure.

Figure 2:
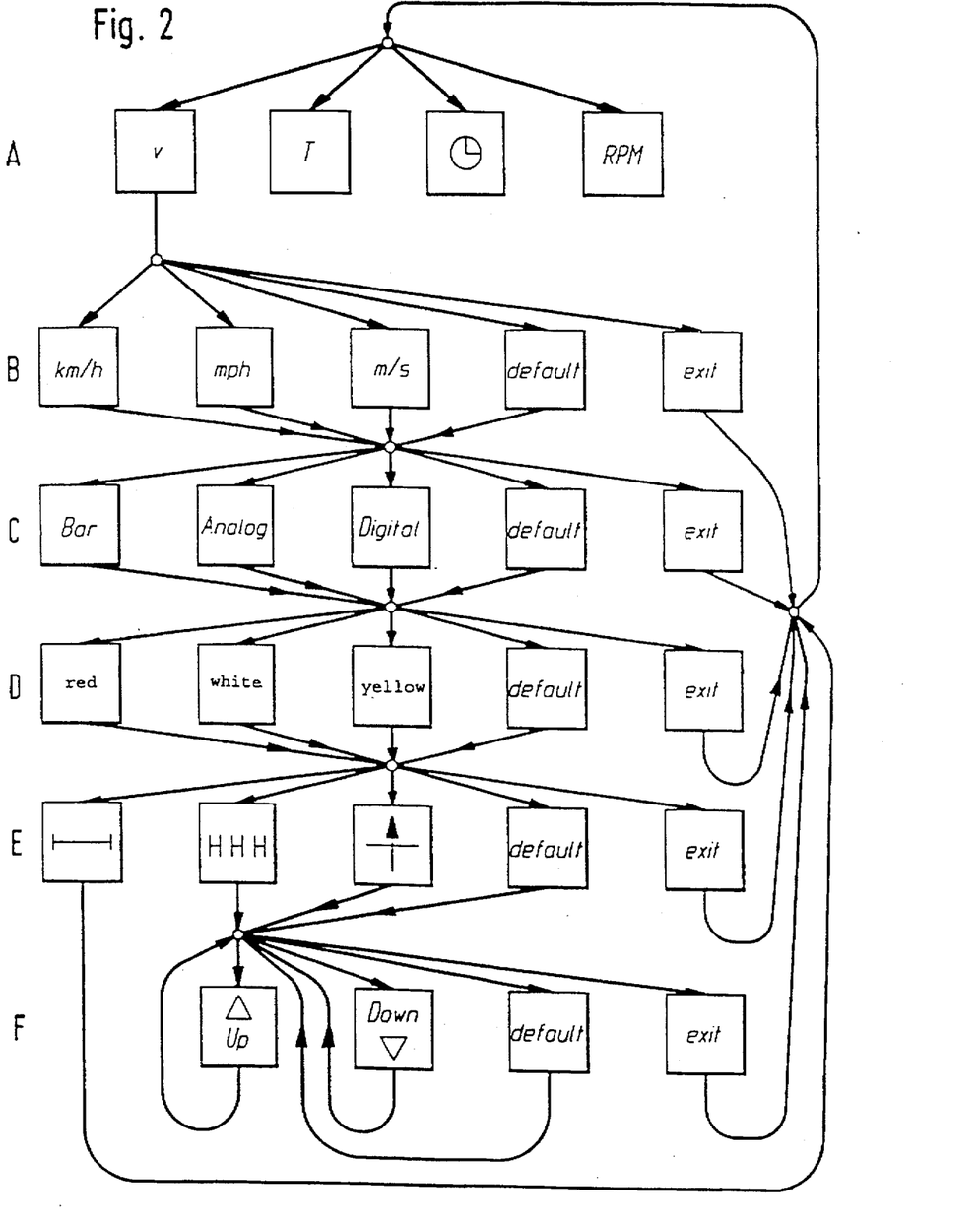
FIG. 2 shows an example of a selection menu, in accordance with the present invention.

FIG. 2 represents an example of a menu for the range of options 8. In this example, the menu has six levels: a main level A and subordinate levels B, C, D, E and F. On the main level A, the user is offered, for example, the four items of information, speed V, temperature T, time and rotational speed RPM, in the range of options 8. For the sake of clarity, subordinate levels are shown in FIG. 2 only in connection with the speed. After the speed V has been selected using the keypad 10, the range of options 8 changes and now offers the selection of various possible units of velocity, such as kilometers per hour, miles per hour or meters per second. In addition, a control field 9 DEFAULT and a further control field 9 EXIT are provided. By selecting the control field 9 EXIT, the user is returned to the main menu. By selecting one of the other control fields 9, the desired unit of measurement is used, or if the control field 9 DEFAULT is selected, a unit of measurement permanently stored in the display processor 14 is used.

The further submenus are constructed identically. Thus, the form of representation is selected in the subordinate level C, with the choice, in the example shown, being between a bar graph display, an analog display and a digital display. The subordinate level D offers the user the choice of various colors for the display. The subordinate level E offers the alternatives of a continuous display, a periodically interrupted display or a threshold value-dependent display. Finally, the subordinate level F provides the opportunity of defining various display parameters. For example, in the case shown, the control fields 9 UP and DOWN can be used to adjust the duration of the periodic interruption or the level of a threshold value triggering a display. Menus for all the information affecting the vehicle can be represented analogously in the range of options 8.

By means of the above-described menu selection, the user can effect a personal display of information on the screen 1 that is tailored very precisely to the user's preferences. To accomplish such a customization, it is in principle possible to offer in the menu every variable relating to the display, no matter how detailed, and by means of the EXIT control fields, the user can break off the selection procedure at any time if he so desires. Since storage of the personal display profile in connection with a personal identifier is provided, the user is not forced to repeat the input procedure every time the vehicle or the display device is put into operation again, but instead, after starting, the user will be prompted via the selection field 2 to input the personal identifier.

Figure 3:
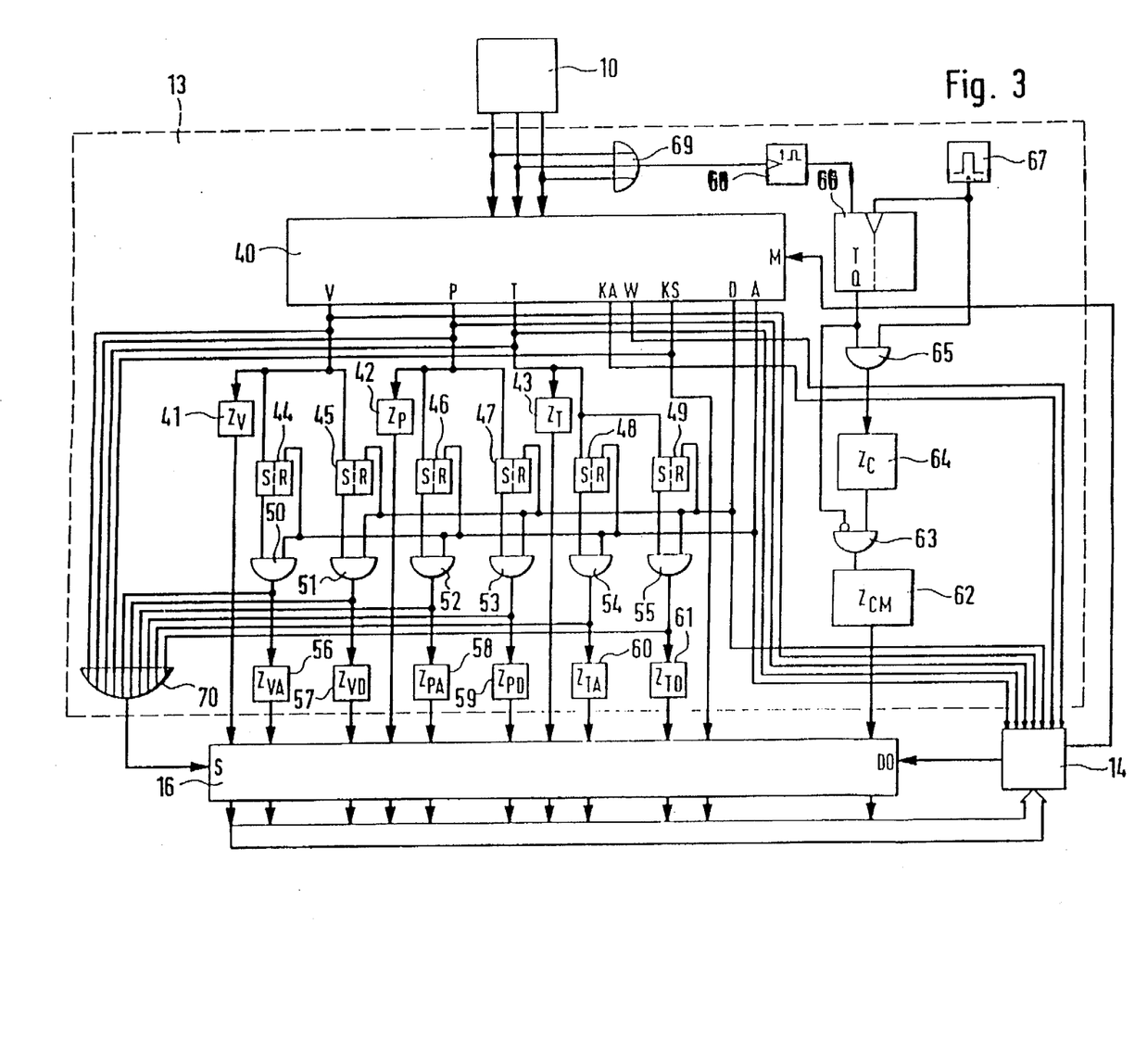
FIG. 3 shows a circuit diagram for an evaluation unit, in accordance with the present invention.

FIG. 3 shows a block circuit diagram of the evaluation unit 13. The output signals of the keypad 10 are supplied via a plurality of output lines to a decoder 40 and to a first OR gate 69. The decoder 40 has a first output V which is supplied to the set inputs of a first flip-flop 44 and of a second flip-flop 45 and also to the clock input of a first counter 41. A second output P of the decoder 40 is in turn fed to set inputs of a third flip-flop 46 and of a fourth flip-flop 47 as well as to the clock input of a second counter 42. The decoder 40 has a third output T which is supplied to the clock input of a third counter 43 as well as to the set inputs of a fifth flip-flop 48 and of a sixth flip-flop 49.

In addition, the decoder 40 has a fourth output D which is connected to the reset inputs of the sixth flip-flop 49, of the fourth flip-flop 47 and of the second flip-flop 45. The reset inputs of the first flip-flop 44, of the third flip-flop 46 and of the fifth flip-flop 48 are connected to a fifth output A of the decoder 40.

Connected upstream of the clock input of a fourth counter 56 is a first AND gate 50, the first input of which is connected to the Q output of the first flip-flop 44. In the same way, a fifth counter 57 with a second AND gate 51 at its clock input is arranged at the Q output of the second flip-flop 45. This also applies to a sixth counter 58 and a third AND gate 52 at the Q output of the third flip-flop 46, as well as to a seventh counter 59 and a fourth AND gate 53 at the Q output of the fourth flip-flop 47, an eighth counter 60 and a fifth AND gate 54 at the Q output of the fifth flip-flop 48 and also finally to a ninth counter 61 and a sixth AND gate 55 at the Q output of the sixth flip-flop 49. In addition, the fifth output A of the decoder 40 is fed to the further input of the first AND gate 50, of the third AND gate 52 and of the fifth AND gate 54. Likewise, the fourth output D of the decoder 40 is connected in each case to a second input of the second AND gate 51, of the fourth AND gate 53 and of the sixth AND gate 55.

The decoder 40 also has a sixth output KS which is fed to an input of the memory means 16. Further inputs of the memory means 16 are connected to the outputs of all the counters 41, 42, 43, 56, 57, 58, 59, 60 and 61. The inputs of all the counters 41, 42, 43, 56, 57, 58, 59, 60 and 61 are connected to inputs of a second OR gate 70, the output of which is connected to a store input S of the memory means 16. In addition, a further input of the second OR gate 70 is connected to the sixth output KS.

A monoflop 68 is arranged between the T input of a T flip-flop 66 and the first OR gate 69. The Q output of the T flip-flop 66 and the output of a clock generator 67 are provided as inputs to a seventh AND gate 65. The clock output of the clock generator 67 is also connected to the clock input of the T flip-flop 66. Connected downstream of the seventh AND gate 65 is the clock input of a tenth counter 64, the output of which is connected to one input of an eighth AND gate 63. The further input of the eighth AND gate 63 is connected to the inverted Q output of the T flip-flop 66. The output of the eighth AND gate 63 is coupled to an averaging device 62, the output of which is supplied to an input of the memory means 16.

The decoder 40 further includes a seventh output KA and an eighth output W which are supplied directly to the display processor 14. One output of the display processor 14 is connected to a read input DO of the memory means 16. All outputs of the memory means 16 are fed to the display processor 14. A line extends from the display processor 14 to a menu input M of the decoder 40. The first output V, the second output P, the third output T, the fourth output D and the fifth output A are also supplied to inputs of the display processor 14.

The output signals of the keypad 10 are decoded in the decoder 40 and the results of the decoding are assigned to exactly one of the outputs V, P, T, KA, W, KS, D and A of the decoder 40. The signal present at the menu input M, which notifies the decoder 40 of the selection options offered by the range of options 8 currently being displayed, is also used for this purpose. Using this information, a clear assignment of the input to exactly one of the outputs V, P, T, KA, W, KS, D and A of the decoder 40 is possible.

The aforesaid labels for the decoder outputs are intended to represent exemplary inputs into the display device. Thus, for instance, the label "V" signifies that the information on the speed was selected by means of the keypad 10, whereas "P" signifies that the information on the air pressure was selected and "T" signifies that the information on the temperature was selected. The command "advance", which is abbreviated here as "W", is used to advance through menus in the selection area 2 of the screen 1 (FIG. 1). In addition, the user has the option of entering a personal identifier and storing the selection made or the associated counter readings of the counters 41, 42, 43, 56, 57, 58, 59, 60, 61 and of the averaging device 62, together with the personal identifier, as personal data in the memory means 16.

Conversely, it is possible to identify oneself by means of said personal identifier and consequently to call up previously stored settings on the display. The assignment of the input to the sixth decoder output KS signifies that the user wishes to store a setting together with the personal identifier, whereas a signal at the seventh decoder output KA is intended to initiate the reading out of the settings present in the memory means 16 and their further processing in the display processor 14.

It is furthermore assumed for the exemplary embodiment, that only the option of selecting between an analog and a digital form of representation is available for the selection of the form of representation. These choices are represented by the fourth output D and the fifth output A, where "D" stands for digital display and "A" stands for analog display.

From the display processor 14, the information proceeds to the decoder 40, the range of options 8 of which are currently being displayed in the selection area 2. By assigning the signals arriving from the keypad 10, which indicate which key has just been pressed, to the information that has just been displayed, it is determined in the decoder 40 which command is to be executed as a result of the key actuation just performed. If the decoder 40 detects on the basis of the incoming signals which of the selectable commands is to be executed, then the decoding operation causes the appearance of a logical "1" at the corresponding output of the decoder 40.

The selection of a particular item of information V, P or T causes the associated counter 41, 42 or 43 to be incremented. As such, the contents of each counter 41–43 represents a measure of the selection frequency of the associated information. Depending on which of the outputs V, P or T the logical "1" was applied to, the corresponding flip-flops 44, 45, 46, 47, 48, 49 are set via the set inputs, so that a logical one is present at two of the Q outputs. If the selection of a form of representation is entered next, then the respective output D or A of the decoder 40 causes one of the counters 56, 57, 58, 59, 60, 61 to be incremented via one of the AND gates 50, 51, 52, 53, 54, 55 connected downstream of the flip-flops 44, 45, 46, 47, 48, 49. As such, the contents of each counter 56, 57, 58, 59, 60, 61 provides a measure of how frequently the selected form of representation has already been selected for the associated information. The counter readings of all the counters 41, 42, 43, 56, 57, 58, 59, 60, 61 are present at inputs of the memory means 16 where they are stored by the triggering of a store operation. The store operation is triggered by a logical "1" at the output of the second OR gate 70, which occurs whenever the counter reading of a counter 41, 42, 43, 56, 57, 58, 59, 60, 61 changes or the command "KS" is decoded.

In addition, the monoflop 68 is triggered, via the first OR gate 69, by every key actuation on the keypad 10, whereupon a logical "1" appears at the Q output of the T flip-flop 66. With the logical "1" at the Q output of the T flip-flop 66, the seventh AND gate 65 becomes transmissive for the clock signals of the clock generator 67. A counting operation then begins in the tenth counter 64 which continues until the counter receives no more pulses as a result of the output of the seventh AND gate 65 being inhibited. The inhibition of the seventh AND gate 65 takes place the next time a key on the keypad 10 is pressed, since this causes a triggering of the T flip-flop 66 and hence an inverting of the logic state of the Q output. The counter reading is consequentially a measure of the time that elapses between two key actuations. As a result of the inversion of the Q output of the T flip-flop 66, the eighth AND gate 63 becomes transmissive for the output of the tenth counter 64, whereupon the counter reading of the latter proceeds to the averaging device 62.

In the averaging device 62, all the counter readings are averaged and hence all the measured time values if several time measurements were made between a plurality of key presses. The average calculated by the averaging device 62 is thus an approximate measure of the operating speed for the operation of the keypad 10. This average is likewise supplied to the memory means 16.

The monoflop 68 serves to maintain the logic state at the output of the first OR gate 69 until the clock edge triggering the T flip-flop 66 is present at the clock input of the T flip-flop 66. The time constant of the monoflop 68 is therefore selected to be not much greater than the period of the clock generator 67. In order to obtain as exact a time measurement as possible, the clock frequency should be selected to be very high.

It is likewise provided that the functions shown in FIG. 3 in the form of a circuit are executed by means of a software program in a computer.

Figure 4:
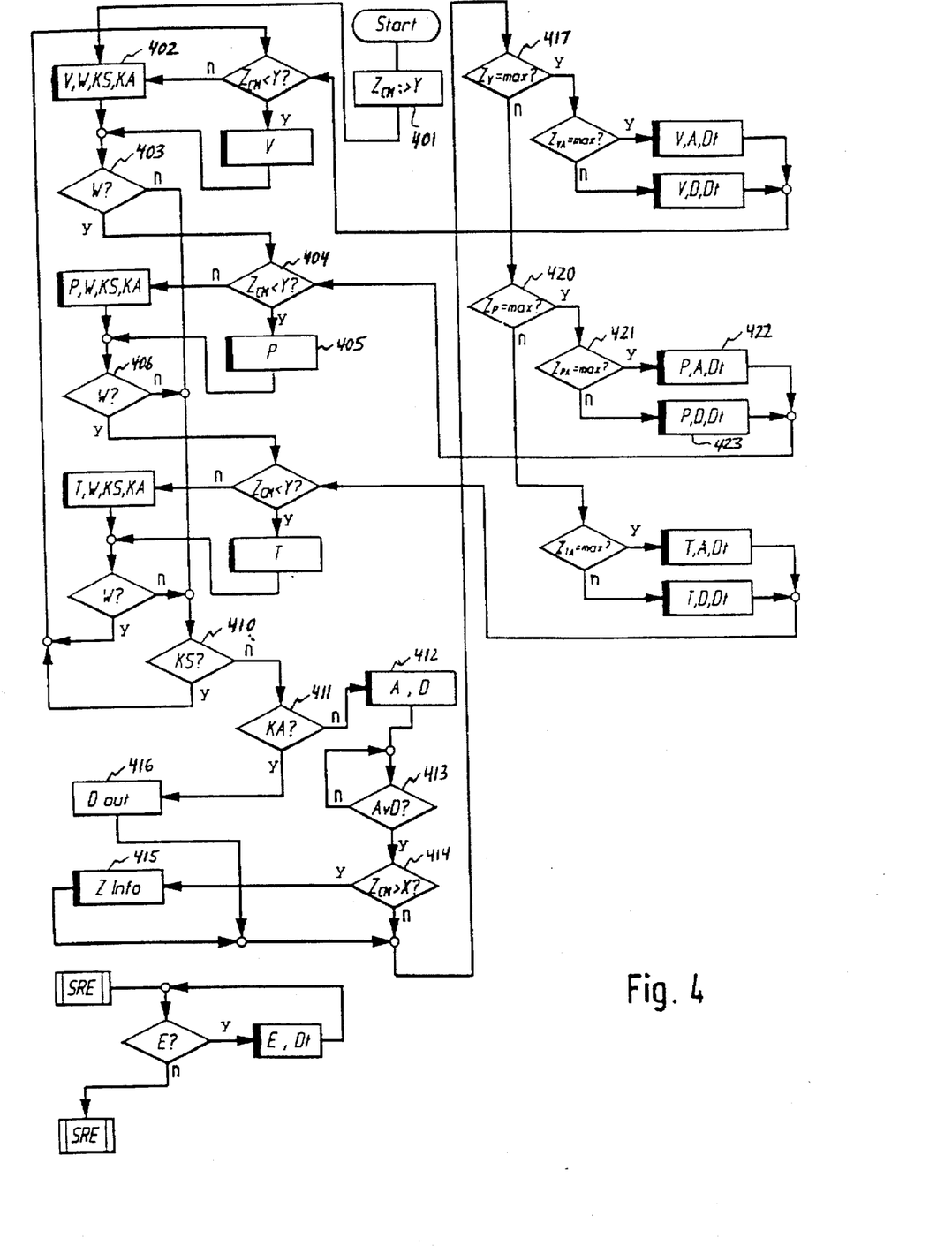
FIG. 4 shows a flowchart of a method in accordance with the present invention.

The function of the display processor 14 will now be explained with reference to FIG. 4 which shows a flowchart of a process which is realized in the display processor 14. After the start of the process, a variable representing the average $Z_{CM}$ is initialized, at step 401, to a value that exceeds a predetermined threshold value Y. A range of options 8 (see FIG. 1) is then displayed, at step 402, with the selection options of information represented by the abbreviations V, W, KS and KA. For ease of identification, all the information or forms of representation to be displayed on the screen 1 are represented in FIG. 4 in blocks having a thick left border. The selection of the control field with the letter "V" signifies that the user wishes to display the speed. If the input "W" is selected, this signifies that none of the information offered is wanted and the user wishes to page forward onto a further menu page. The input of the command "KS" indicates that the user has just entered a personal identifier which he wishes to have stored together with the settings made up to that point. Conversely, the command "KA" indicates that the user wishes to read out stored settings from the memory means 16 on the basis of the personal identifier just entered and wishes the information and forms of representation corresponding to these settings to be displayed on the screen 1.

After the display in step 402 of the range of options on the screen 1, the input is interrogated in step 403 so that a check is made as to whether an input has been made, and if so whether the input corresponds to the command "W", i.e., whether the user wishes to page forward. If "W" was input, it is then checked, in step 404, whether the average $Z_{CM}$ is below the threshold value Y, i.e., whether the user is a skilled user. If this is found to be the case, then the display of the range of options is automatically simplified so that only new information is displayed. As an example, step 405 shows that "P", for the selection of the air pressure, is displayed. The already known information "W", "KS" and "KA" is suppressed, since it can be assumed that the user no longer requires this information.

Since the user has made it clear by means of the command "W" at the first input (step 403) that he does not wish to display the speed V, the selection of the air pressure P is now offered as information. Here again the user has the option of paging forward (by inputting "W") and hence of being offered the information on the temperature T, of entering a personal identifier in order to store settings (input "KS") or of reading out stored settings (input "KA"), or else of having the information on the air pressure P displayed (input "P"). If the user indicates the command "P" as his selection, then the interrogation for the input "W", at step 406, receives a negative response. The program therefore branches to step 410 in which it is determined whether a command "KS" was input. In this case, a store operation would then take place, which was already performed in the evaluation unit 13, which would then be followed by a return into a main loop. The main loop is formed by interrogations for the input of "W" causing a paging forward through all menu levels until the program pages forward to the first menu level again from the last menu level, whereupon the start of the main loop is reached again.

After each interrogation for the input of the command "W" with a positive response, the program interrogates for the speed of operation (i.e., is $Z_{CM}<Y$ ?) within the main loop in order to determine whether the display can be simplified for the skilled user. Once the level of experience of the user has been determined by means of this interrogation, and the display has been simplified, if appropriate, new information is offered for selection. Since in this example the user has opted to display the information "P", the interrogation for the command "KS" receives a negative response and the program branches to the further interrogation at step 411 as to whether the command "KA" was entered. The query at step 411 also receives a negative response and the options of the forms of representation "A" and "D", which are available for the air pressure P, are offered in step 412. A further interrogation follows at step 413 in which the program waits until the selection of a form of representation has been input (i.e., A or D). Once the user has made this selection, the program proceeds to step 414 in which it is determined whether the average $Z_{CM}$ exceeds a predetermined further threshold value X ($Z_{CM}>X$ ?). This is the case if the user is still unskilled with the display device and the selection procedure. In this case, additional information $Z_{Info}$ is provided under program control, which is then displayed together with the range of options 8 at step 415.

If, it is determined in step 411 that the command input "KA" was made and detected, then operation proceeds to step 416 in which the memory means 16 is caused, by means of a signal over the connection between the display processor 14 and the read input DO, to transfer the stored settings for the information and its forms of representation to the display processor 14 (DOut). As a result, just as with a manual input of information and its forms of representation, counter readings and the average $Z_{CM}$ are then present in every case, which are then to be used for displaying information with the associated forms of representation.

After step 415 or 416, the program then proceeds to determine, starting with step 417, whether the counter reading of the first counter 41 is greater than that of the second counter 42 or of the third counter 43 (i.e., $Z_v$=max?). Since this is not the case in the example given here, the program branches to step 420 in which it is determined whether this applies to the counter reading of the second counter 42 ($Z_p$=max?). Since it is assumed in this example that the user has selected the air pressure P, the response to the query at step 420 is in the affirmative and the program proceeds to a further interrogation at step 421 as to whether the counter reading of the sixth counter 58 is greater than the counter reading of the seventh counter 59 (i.e., $Z_{PA}$=max?). In plain terms, this signifies whether a digital or an analog form of representation was selected for representing the air pressure information. If the analog form of representation was selected, the counter reading of the sixth counter 68 is greater than that of the seventh counter 59, with the result that the air pressure (P) is displayed in step 422 in analog form (A) using the associated data from the sensors 18 (Dt). Analogously, the other information V, T is displayed in analog (A) or digital (D) form using the associated data (Dr).

After the associated data have been displayed, the program branches back to the main loop, it being taken into account here that the information selected is also very probably the most important information for the user. For this reason, the respective information is accordingly placed at the top level of the menu in the menu now displayed for the range of options 8. As a result, inputs with respect to this most important information can be executed with fewer key actuations.

After the representation in steps 422 or 423 of the information on the air pressure P, operation branches back to the main loop at the point (step 404) at which the interrogation of the user speed takes place (i.e., $Z_{CM}<Y$?) to determine whether the range of options is to be represented in detailed or in reduced form.

An interrupt routine is additionally provided, which ideally executes parallel to the program just described, in which an interrogation is periodically made as to whether an event E which requires displaying is present. Above all, this covers events E of the kind that affect the user to such an important degree that they exceed the importance of the settings made by the user. If such an event E occurs, then this event E is displayed immediately with the associated data (E, Dt). If the event E disappears, then the previous setting made by the user is taken into account again, and the displaying on the screen 1 is executed in accordance with the type desired by the user.

What is claimed is:

1. A method for displaying information on a screen of a display device, in which the information to be displayed and the form of representation of the information to be displayed are selected by a user, by actuation of command keys, from a range of options displayed on the screen, the method comprising the steps of:

receiving the user's selection of at least one of the information to be displayed and the form of representation of the information to be displayed;

evaluating the user's selections with respect to at least one of a frequency distribution of the user's selections and a time interval between at least two actuations of the command keys as a measure of a user operating speed; and displaying on the screen, in accordance with the results of the evaluating step, at least one of the range of options, the information and the form of representation of the information.

2. The method according to claim 1, wherein the range of options is displayed in a form including at least one of a symbol, letter and number.

3. The method according to claim 1, wherein the range of options is changed so that if a low user operating speed is determined, additional information is displayed on the screen as an operating aid for the user.

4. The method according to claim 1, wherein the range of options is changed so that if a high user operating speed is determined, no representation or a simplified representation of the range of options is displayed on the screen.

5. The method according to claim 1, wherein the range of options is changed so that the information or the forms of representation that are frequently selected are offered so that fewer actuations of the command keys are required to select such information or forms of representation than are required to select information or forms of representation that are selected less often.

6. The method according to claim 1, wherein the range of options is offered in the form of a menu which has at least one main level and at least one subsidiary level, and wherein after at least one actuation of at least one of the command keys, the menu branches from the main level into the subsidiary level.

7. The method according to claim 6, wherein if it is determined that a particular item of information is frequently selected, the particular item of information is preferentially offered for selection on the main level of the range of options.

8. The method according to claim 1, wherein regardless of the information selected and the form of representation selected, preselected important information is always displayed on the screen or is displayed repeatedly at periodic intervals or is displayed immediately upon the occurrence of an event associated with said important information.

9. The method according to claim 8, wherein information other than the preselected important information is displayed after a predetermined time period or after the disappearance of the event associated with the important information.

10. The method according to claim 1, further comprising the steps of:

storing data indicative of at least one of the range of options, the information to be displayed and the forms of representation of the information to be displayed; and displaying on the screen, in accordance with the stored data, at least one of the range of options, the information and the forms of representation of the information.

11. The method according to claim 10, wherein the data is stored together with a personal identifier.

12. The method according to claim 11, wherein the data is retrieved using the personal identifier.

* * * * *

UNITED STATES PATENT AND TRADEMARK OFFICE
CERTIFICATE OF CORRECTION

PATENT NO. : 5,732,368
DATED : March 24, 1998
INVENTOR(S) : Knoll, et. al.

It is certified that error appears in the above-identified patent and that said Letters Patent is hereby corrected as shown below:

Column 5, line 18, "period for example," should be -- periodic intervals, --.

Column 10, line 50, "(Dr)." should be -- (Dt). --.

Signed and Sealed this

Seventeenth Day of November, 1998

Attest:

BRUCE LEHMAN

*Attesting Officer*                *Commissioner of Patents and Trademarks*